United States Patent [19]

Kataoka et al.

[11] Patent Number: 5,218,377
[45] Date of Patent: Jun. 8, 1993

[54] LASER PRINTING DEVICE WITH CONTROL OF OSCILLATION AMPLITUDE

[75] Inventors: Keiji Kataoka; Susumu Saito; Takeshi Mochizuki, all of Ibaraki, Japan

[73] Assignee: Hitachi Koki Co., Ltd., Tokyo, Japan

[21] Appl. No.: 689,575

[22] Filed: Apr. 23, 1991

[30] Foreign Application Priority Data

Apr. 27, 1990 [JP] Japan .................................. 2-113010

[51] Int. Cl.$^5$ .............................................. H04N 1/21
[52] U.S. Cl. .................................... 346/108; 358/296
[58] Field of Search ................... 346/1.1, 108, 107 R, 346/76 L, 160; 358/296, 300, 302

[56] References Cited

U.S. PATENT DOCUMENTS 5,053,619 10/1991 Arimoto ............................. 346/108

Primary Examiner—Mark J. Reinhart
Attorney, Agent, or Firm—Sughrue, Mion, Zinn, Macpeak & Seas

[57] ABSTRACT

In a laser printing device in which a laser beam is deflected in a scanning mode while its intensity is being modulated, to record a halftone image on an optical recording material, the scanning laser beam is oscillated in a direction substantially perpendicular to the scanning direction within one pitch of the scanning line formed on the optical recording material, and the oscillation of the scanning laser beam is changed in amplitude by a signal provided by a computer, whereby a halftone image is recorded with high accuracy.

3 Claims, 3 Drawing Sheets

FIG. 4(d')

LASER PRINTING DEVICE WITH CONTROL OF OSCILLATION AMPLITUDE

BACKGROUND OF THE INVENTION

This invention relates to laser printing device, and more particularly to a laser printing device which is suitable for recording or printing images gradated in density, or having halftones (hereinafter referred to as "halftone images".

Heretofore, in order to record halftone images, a method is employed in which the intensity of a laser beam applied to an optical recording material is modified in an analog mode. However, the method is disadvantageous in that, when the optical recording material is employed which is low in the characteristic of gradation with respect to optical intensity, two-valued records, namely, black and white are excessively emphasized. This difficulty can be effectively eliminated by the employment of a halftone recording method in which the recording of an image is carried out substantially in a binary mode; that is, large dots are employed for black regions, and small dots are employed for gray regions the color of which is nearly white. In a conventional halftone forming system, a laser beam applied to an optical system is changed in position, to cause an aberration in the optical system thereby making the resultant light spot foggy. However, the method suffers from a difficulty that the relationship between the fogginess of the light spot and the laser beam's incident position is relatively low in linearity, and therefore it is difficult to record halftone images with high accuracy.

SUMMARY OF THE INVENTION

Accordingly, an object of this invention is to eliminate the above-described difficulties accompanying a conventional method of recording halftone images.

More specifically, an object of the invention is to provide a laser printing device which practices a halftone recording method to record halftone images with high accuracy.

The foregoing object and other objects of the invention have been achieved by the provision of a laser printing device in which a laser beam is deflected in a scanning mode while the intensity of the laser beam is being modulated, to perform an optical recording operation with an optical recording material, which, according to the invention, includes: oscillating means for oscillating a scanning laser beam in a direction substantially perpendicular to a scanning direction within one pitch of a scanning line formed on the optical recording material, the oscillation of the scanning laser beam being changed in amplitude by a signal provided by a computer, to perform an optical recording operation.

In the laser printing device, the gradation characteristic may be improved by changing the intensity of the laser beam reaching the optical recording material with the amplitude of oscillation of the scanning laser beam, because as the amplitude of oscillation increases, the intensity per unitary area of the laser beam applied to the optical recording material is decreased.

In the laser printing device, the oscillating means may be an optical deflector based on an electro-optical effect.

The nature, principle and utility of the invention will become more apparent from the following detailed description when read in conjunction with the accompanying drawings.

BRIEF DESCRIPTION OF THE DRAWINGS

In the accompanying drawings:

FIGS. 4(a) to 4(f) and 4(d') are time charts showing various signals in the laser printing device of the invention;

DETAILED DESCRIPTION OF PREFERRED EMBODIMENTS

Figure 1:
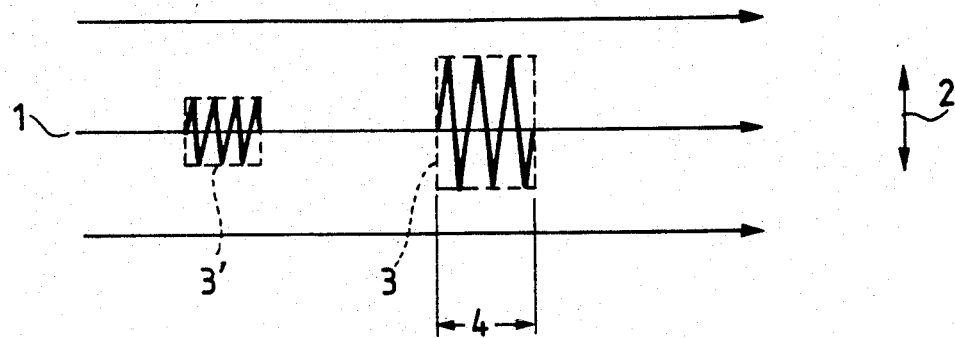
FIG. 1 is an explanatory diagram for a description of a halftone recording system according to the invention.

As conducive to a full understanding of this invention, first a halftone recording system according to the invention will be described briefly with reference to FIG. 1. In the halftone recording system, a scanning line 1 is oscillated in a direction 2 perpendicular to the scanning direction (the direction 2 may be called "an auxiliary scanning direction"). In this case, the amplitude of oscillation corresponds to the dimension of a halftone dot 3 or 3' in the auxiliary scanning direction. On the other hand, the dimension 4 of the halftone dot in the scanning direction is determined by the period of time for which the laser beam is modulated. Hence, the size of a halftone dot is recorded accurately, and accordingly a halftone image can be recorded with high accuracy.

Figure 2:
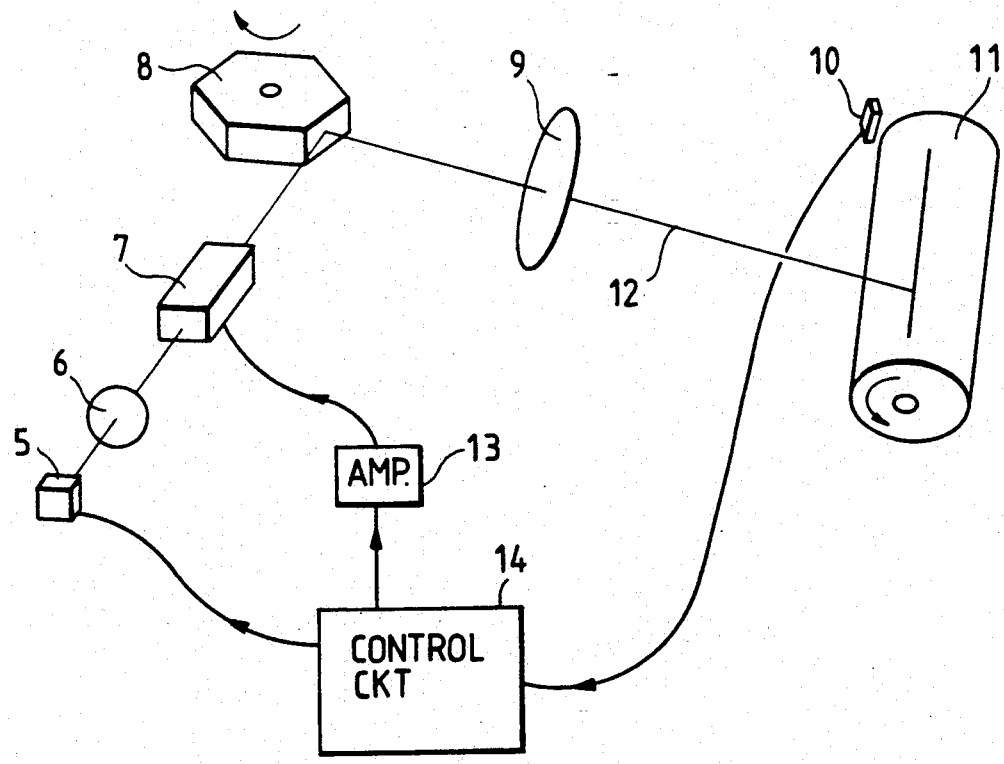
FIG. 2 is an explanatory diagram showing the arrangement of a laser printing device according to the invention.

An example of a laser printing device according to this invention will be described with reference to FIG. 2.

Figure 4A:
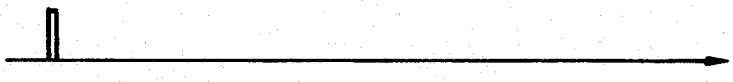
Figure 4B:
Figure 4C:
Figure 4D:
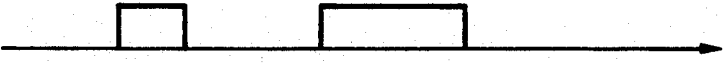
Figure 4E:

In the laser printing device, the output laser beam of a semiconductor laser 5 is converted into a parallel beam by a lens 6, and the laser beam thus processed is applied through an electro-optical element 7 adapted to oscillate a scanning laser beam to a rotary polygon mirror 8, where it is deflected in a scanning mode. The laser beam thus deflected (indicated at 12 in FIG. 2) is applied through an Fθ lens 9, as a light spot, onto a photo-sensitive drum 11; that is, the latter 11 is scanned with the light spot. The position of the scanning light beam is detected by a photo detector 10 disposed near the photo-sensitive drum 11. The output signal of the photo detector 10 is applied, as a synchronizing signal for optically recording data, to a control circuit 14. The synchronizing signal is as shown in FIG. 4(a). With the synchronizing signal as a trigger signal, a data reading clock signal is produced as shown in FIG. 4(b). The data reading clock signal thus produced is used to read data as shown, for instance, in FIG. 4(d) which is to be optically recorded. The data thus read is applied to the semiconductor laser 5 shown in FIG. 2, to binary-modulate the output laser beam of the semiconductor laser 5. Thus, the data is optically recorded on the photo-sensitive drum 11. In synchronization with the production of the data reading clock signal, a gradation clock signal is produced as shown in FIG. 4(c) the frequency of which is an integer factor of the data reading clock signal. The data to be recorded includes a binary signal as shown in FIG. 4(d) and a signal for gradation as shown in FIG. 4(e). In FIG. 4(e), the signal smaller in amplitude indicates data of gray which is nearly white, and the signal larger in amplitude indicates data of a color which is nearly black. The signal for gradation (FIG. 4(e)) (hereinafter referred to as "a gradation signal (e)" and the gradation clock signal (FIG. 4(c)) (hereinafter referred to as "a gradation clock signal (c)" are used to form a signal for driving the electro-optical element 7 which is shown in FIG. 4(f) (herein after referred to as "a drive signal (f)".

Figure 4F:
Figure 3:
Figure 5:
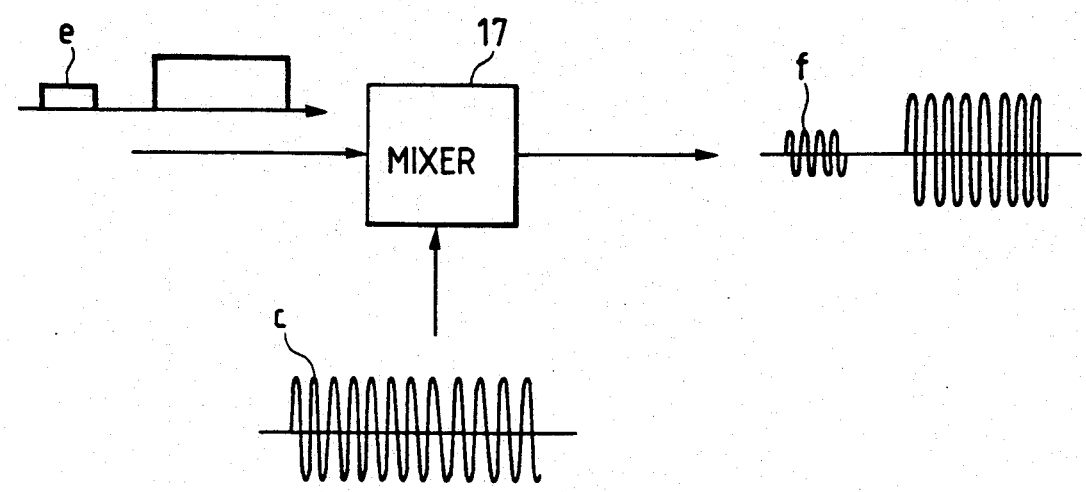
FIG. 5 is a diagram for a description of a method of forming a signal which is applied to the electro-optical element.

The signal for driving the electro-optical element 7 (FIG. 4(f)) is formed by a circuit shown in FIG. 5. The circuit comprises a mixer 17 which receives the gradation signal (e) and the gradation clock signal (c). The gradation clock signal (c) is shown substantially as a sinusoidal wave signal (c) in FIG. 5, being considerably high in frequency. In the mixer 17, the gradation clock signal (e) is amplitude-modulated with the gradation signal (c), to provide the aforementioned drive signal (f).

Figure 6A:
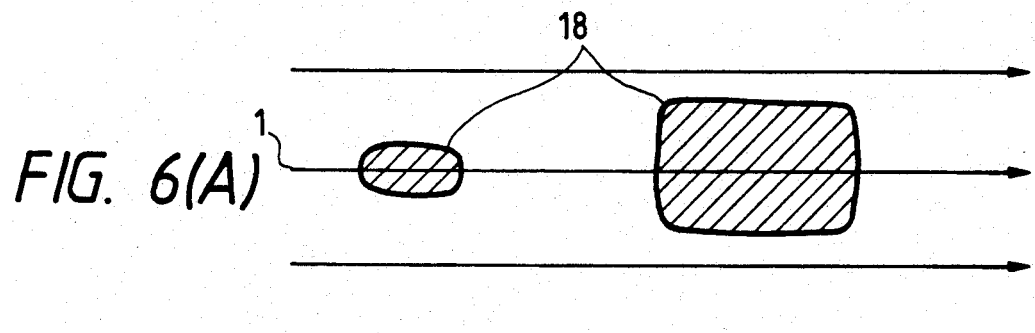
FIGS. 6(a) and 6(b) are explanatory diagram showing examples of the result of a halftone recording operation according to the invention.
Figure 6B:
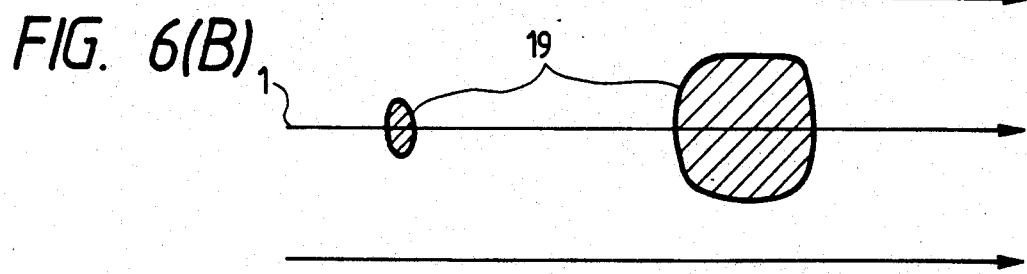

The electro-optical element 7 is so positioned that, when the drive signal (f) is applied thereto from the control circuit 14 through an amplifier 13, the scanning laser beam is oscillated in a direction perpendicular to the scanning direction. Hence, as indicated at 18 in FIG. 6, the data are recorded as area-modulated halftones on the photo-sensitive drum.

Figure 3:
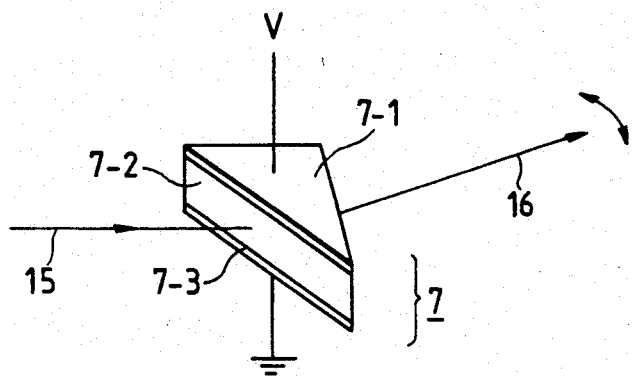
FIG. 3 is an explanatory diagram showing an electro-optical element in the laser printing device of the invention.

One example of the electro-optical element 7 is shown in FIG. 3, and includes an electro-optical crystal 7-2 and two electrodes 7-1 and 7-3 formed on the upper and lower surfaces of the crystal 7-2 by vacuum deposition. Upon application of a voltage between the electrodes 7-1 and 7-3, the refractive index of the electro-optical crystal 7-2 is changed, so that the emergent laser beam 16 is deflected as indicated by the arrow. It is preferable that the electro-optical element is of an optical waveguide type, because it can be driven with a low voltage.

FIG. 4(d') is for a description of a halftone recording operation which is carried out in the scanning direction. In FIG. 4(b), the data reading clock pulse interval corresponds to one picture element. In the case of FIG. 4(d'), the semiconductor laser is driven by using the gradation clock signal shown in FIG. 4(c) in such a manner that a pulse short in duration is applied for a picture element which is nearly white while a pulse long in duration is applied for a picture element which is nearly black. The addition of the above-described function makes it possible to record halftones both in a direction perpendicular to the scanning direction and in a direction parallel with the scanning direction, with the result that images can be recorded with high accuracy.

Thus, the laser printing device of the invention can record halftone images with high accuracy according to the halftone recording method.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A laser printing device in which a laser beam is deflected in a scanning mode while the intensity of said laser beam is being modulated to perform an optical recording operation with an optical recording material, said laser printing device comprising:
   means for oscillating a scanning laser beam in a direction substantially perpendicular to a scanning direction within one pitch of a scanning line formed on said optical recording material;
   means for providing a control signal; and
   means for changing an amplitude of oscillation of said scanning laser beam according to said control signal.

2. The laser printing device as claimed in claim 1, wherein the intensity of said scanning laser beam impinging upon said optical recording material is varied according to the amplitude of oscillation of said scanning laser beam.

3. The laser printing device as claimed in claim 1, in which said oscillating means comprises an optical deflector based on an electro-optical effect.

* * * * *